United States Patent [19]

Farrow et al.

[11] Patent Number: 4,656,530
[45] Date of Patent: Apr. 7, 1987

[54] METHOD AND APPARATUS FOR SERVO-CONTROL OF TAPE TENSION IN HIGH SPEED TAPE TRANSPORTER

[75] Inventors: Robert I. Farrow; Richard L. Clark, both of Burlington, N.C.

[73] Assignee: American Multimedia, Inc., Burlington, N.C.

[21] Appl. No.: 801,429

[22] Filed: Nov. 25, 1985

[51] Int. Cl.⁴ .......................... G11B 5/86; G11B 15/43
[52] U.S. Cl. ......................................... 360/15; 360/71
[58] Field of Search ................................... 360/15, 71

[56] References Cited

U.S. PATENT DOCUMENTS

| | | | |
|---|---|---|---|
| 3,893,167 | 7/1975 | Stahler | 360/16 |
| 3,921,208 | 11/1975 | Chapman | 360/16 |
| 4,181,426 | 1/1980 | Blossey et al. | 360/132 |

Primary Examiner—George G. Stellar
Attorney, Agent, or Firm—W. Thad Adams, III

[57] ABSTRACT

A vacuum column (34) is used in a closed loop, high-speed tape transporter (10) to maintain constant tension on a moving loop of tape as it is delivered to a pick-up head (20) of the transporter (10). A motor driven capstan (35) intermediate a tape storage bin (23) and the vacuum column (34) pulls the loop of tape from bin (23) and delivers it to the vacuum column (34). A servo-control (39), (40), (41) senses changes in the position of the tape within the vacuum column (34) caused by tension changes of the tape within the bin (23) and sends a signal responsive to the change of position of the tape in the vacuum column (34) to the capstan motor (31), thereby changing its speed sufficient to maintain the position of the tape within capstan (34) at a relatively constant level. Sensing can be by means of a vacuum slot (34), an ultrasonic proximity indicator (42) or a series of photo-optical sensors (44), (45).

14 Claims, 8 Drawing Figures

METHOD AND APPARATUS FOR SERVO-CONTROL OF TAPE TENSION IN HIGH SPEED TAPE TRANSPORTER

TECHNICAL FIELD AND BACKGROUND OF THE INVENTION

This invention relates to a method and apparatus for controlling the tension of a closed loop of recording tape moving at high speed through a master tape transporter. This apparatus, generally known as a master tape transport, provides for high speed production of recorded tapes for cassettes and/or eight-track cartridges but can be used for other media as well. In the embodiment of the invention disclosed in this application, the master tape transport operates at a tape speed of 240 ips (6.1 m/sec) and controls any number of slave transports which produce large reels of cassette tape onto which is recorded a large number of replications, ("albums") of the signal conveyed from the master tape transport. The master tape transporter utilizes a closed loop of recording tape which is passed across a pick-up head where a signal on the tape is picked up and conveyed downstream to the slaved duplicators. The loop of tape is conveyed from the pick-up head of the transporter into a bin for accumulation and storage. The tape accumulates in the bin in the form of a loosely packed series of small loops. The tape is pulled from the bin and back across the pick-up heads repeatedly, with each complete circuit of the master tape creating a single "album" on the reel of tape located at each slaved duplicator.

As is apparent, tape moving at such a high speed is subject to a number of tension variations induced by movement of the tape through the air and contact by the tape with various moving and stationary machine surfaces. Variations in tension create random speed variations and misalignments of the tape with the pick-up heads, all of which result in less than adequate reproduction quality in the recordings produced at the slaved duplicators. Tension variations having a particularly significant amplitude are produced as the closed loop of tape is pulled from the storage bin. The weight of the tape, the distance the tape must travel and the friction of the tape moving past other loops of tape in the bin all create significant tension variations which are very difficult to compensate for. In the prior art, these tension variations have been reduced by passing the tape between a capstan and a capstan idler, the tension on which is adjustable to provide a predetermined mechanical hold-back. Operating experience has shown that the hold-back tension required under prior art devices sufficient to achieve an even marginally acceptable level of tension control results in excessive wear of the pick-up heads and other tape-contacting surfaces, and the tape itself. Increase in wear is due to the need of adjusting the average tension higher. This is to ensure the minimum tension during operation is at least high enough for good reproduction. Therefore, problems with prior art methods of high speed tape duplication involve not only poor quality of the end product, but frequent repair and/or replacement of equipment and master tapes.

The problem has become more critical in recent years as audio tape cassettes have become more sophisticated. Wow, flutter, frequency drop-outs and other defects which might not have been noticed on earlier, more primitive cassette players are now obvious when played on modern, state-of-the-art players.

It is therefore imperative to improve the quality of cassette recording and manufacture to a significant degree to take advantage of the higher quality playback results which can be achieved in modern cassette players. Furthermore, audio cassettes are now being challenged in the marketplace by "compact disc" technology which is based on digital rather than analog recording and reproduction, and therefore not susceptible to many of the potential variations which apply in the manufacture of audio cassettes.

The most obvious way to improve tape recording quality and machine and master tape life is to substantially reduce duplicating speeds. However, this is not economically practical. In fact, higher, not lower, productivity *and* quality is necessary if the technological life of audio cassette recording and manufacturing is to be extended in the face of newer technologies such as compact discs.

This invention achieves for the first time a means by which tension and speed variations can be reduced by a substantial degree thereby improving recording quality, machine and master tape life significantly. The improvement in tension control is achieved by using a vacuum column as a "buffer" whereby downstream speed and tension variations are substantially altogether eliminated. Of course, vacuum columns have been used in tape drives, winders and similar devices for many years. However, the vacuum columns are used strictly as bin buffers to hold a supply of tape during stop/start transitions and to permit the very rapid stoppage or reversal of tape movement without breaking of damaging the tape. This is particularly true in computer tape drives where vacuum columns have been used for many years to permit very rapid location of data on reels of computer tape by frequent and rapid stopping, starting and reversing of tape movement.

However, insofar as is known, a vacuum column has heretofore not been used as a means of achieving precise tension control of a tape moving at a constant, high rate of speed. Surprising results have been achieved by adapting vacuum column technology for use as a means of precise regulation.

SUMMARY OF THE INVENTION

Therefore, it is an object of the invention to provide hold-back tension in a master tape transporter by means of a vacuum column;

It is another object of the invention to precisely control tension in a master tape transporter by servoregulation of the speed at which the tape is pulled from the transporter storage bin;

It is another object of the invention to provide tension control of a high-speed tape loop in a master tape transporter wherein the vacuum level is adjustable to set the tape tension across the pick-up heads of the transporter;

It is another object of the present invention to use vacuum to clean the master tape before each passage across the pick-up heads;

It is yet another object of this invention to provide a method of controlling tension in a closed loop, high-speed master tape transporter by the use of a vacuum column.

These and other objects of the present invention are achieved in the preferred embodiments disclosed below by providing on a high-speed tape transporter, a vacuum supply, a vacuum column operatively connected to the vacuum supply and positioned in the plane of tape travel intermediate the exit location of a loop of recording tape from the bin of the tape transporter and the pick-up head for receiving the loop of tape during its travel and exerting on the tape a vacuum-induced tension. A motor-driven capstan is positioned in the plane of tape travel intermediate the bin and the vacuum column for pulling the loop of tape from the bin and delivering the tape to the vacuum column. Servo-control means are provided for sensing changes in the position of the tape within the vacuum column caused by tension changes of the tape within the bin. The servo-control means sends a signal responsive to the change of position of the tape in the vacuum column to the capstan motor, thereby varying the capstan speed responsively to the sensed position change of the tape in the vacuum column. The change in capstan speed varies the rate of delivery of the tape to the vacuum column sufficiently to maintain the tape within the vacuum column at a constant tension as the tape is delivered to the pick-up head.

According to one embodiment of the invention, the vacuum column comprises an enclosure having a depth approximately that of the tape to provide a seal between that portion of the vacuum column outside the loop of tape and that portion of the vacuum column inside the loop of tape. At least one sensing slot is positioned in the vacuum column in vacuum communication with the vacuum supply. The sensing slot also interrupts the seal between the outside and inside of the loop of tape within the vacuum column and thereby senses a change in position of the loop of tape within the vacuum column. Information corresponding to tape position-related vacuum pressure is transmitted to servo-control means for servo-regulating the speed of the motor and the capstan.

According to another embodiment of the invention, a series of optical sensors are positioned in spaced-apart relation along the length of the vacuum column, each optical sensor projecting a beam across the vacuum column. Depending on the position of the loop of tape within the vacuum column, one or more of the beams of light from the optical sensors is interrupted. This permits the position of the loop of tape within the vacuum column to be determined and the position of the loop of tape within the vacuum column to be communicated to the servo-control means for servo-regulating the speed of the capstan motor.

In accordance with yet another embodiment of the invention, an ultrasonic proximity sensor is positioned in the bottom of the vacuum column in the area outside the loop of tape. The sensor projects an ultrasonic signal upwardly in the vacuum column into contact with the moving loop of tape and receives the reflected ultrasonic signal. The position of the loop of tape in the vacuum column is calculated from the time delay between the transmission of the ultrasonic signal and the receipt of the reflected signal and this information is communicated to the servo-control means for servo-regulating the speed of the capstan motor.

The method according to this invention comprises pulling the tape under positive feed from the tape bin and delivering the tape to a vacuum column. A vacuum-induced tension is applied to the moving loop of tape and causes the tape to form a loop in the vacuum column. The position of the tape in the vacuum column responsive to tension changes in the tape as it is pulled from the bin is sensed and the speed of delivery of the tape from the bin to the vacuum column is varied responsive to the change in position of the tape within the vacuum column to maintain constant tension on the moving loop of tape as it is delivered to the pick-up head of the tape transport. Regardless of the position of tape within the column the tension at the head is constant since the area affected by vacuum/atmosphere is the same.

BRIEF DESCRIPTION OF THE DRAWINGS

Some of the objects of the invention have been set forth above. Other objects and advantages of the invention will appear as the description of the invention proceeds when taken in conjunction with the following drawings, in which.

DESCRIPTION OF THE PREFERRED EMBODIMENT

Figure 1:
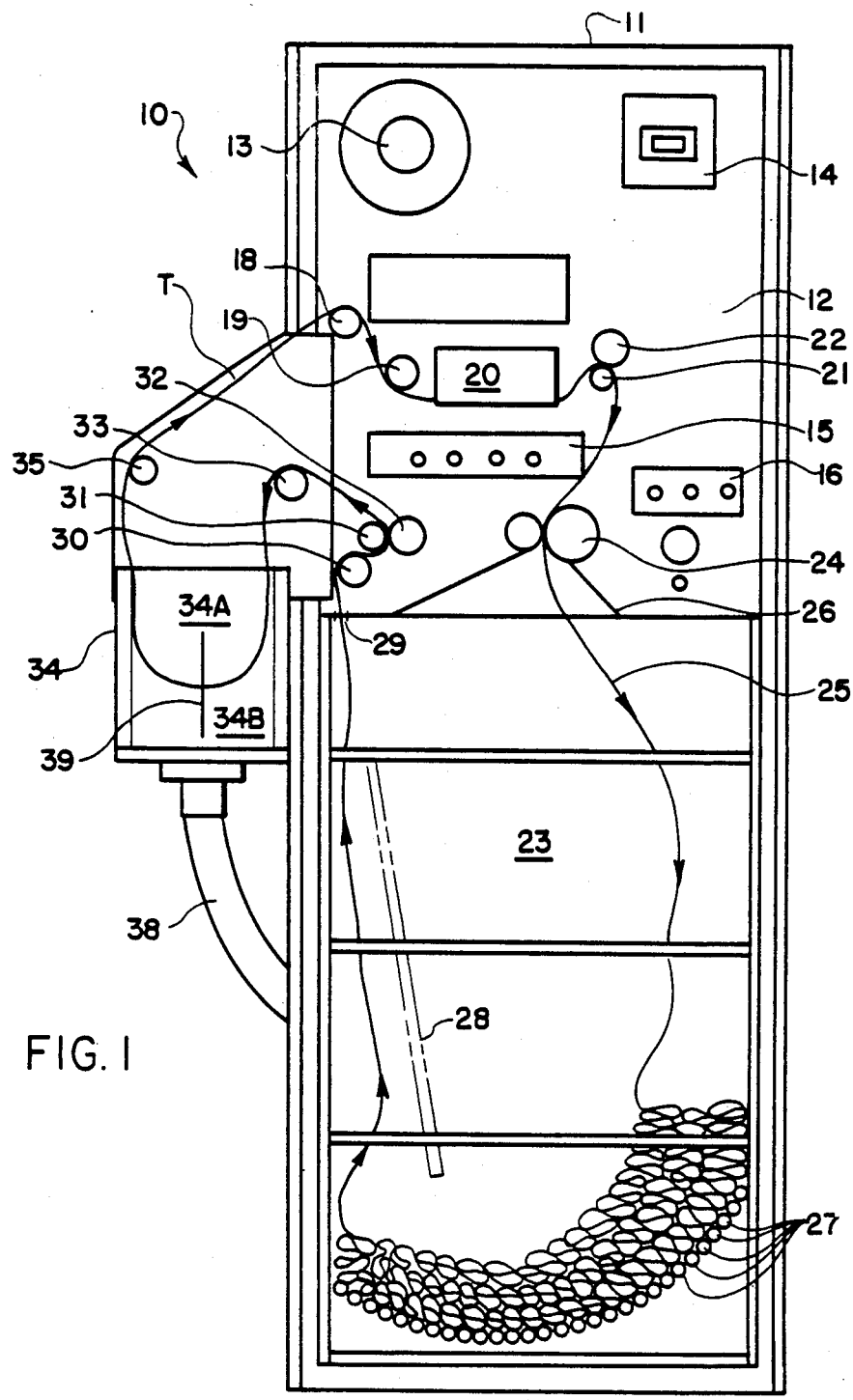
FIG. 1 is a front elevational view of a master tape transporter according to one embodiment of the present invention.

Referring now specifically to the drawings, a master tape transporter according to the invention is shown and generally indicated at broad reference numeral 10. Tape transporter 10 is housed within a vertically extending cabinet 11 with the tape manipulating elements positioned on a front panel 12. Tape transporter 10 includes a supply motor 13. Supply motor 13 is used only when loading and unloading the master tape, and not during duplication. The operating parameters of tape transporter 10 are displayed on a computer display 14. The rewind, fast-forward, stop and start switches and the vacuum and loop bin control switches are located on control panels 15 and 16, respectively.

Duplication takes place by first forming a recorded, master tape into a loop. The loop is formed by splicing the head end and tail end of the tape together. A clear window is formed by removing the oxide layer from one end of the blank tape. Each time the clear window passes an optical sensor, a cue tone indicating the end of one segment of the program material and the beginning of the next segment is placed on the tape being recorded at each of the slave transporter positions.

When correctly installed on tape transporter 10, the loop of tape "T" passes over a guide roller 18 and under a guide roller 19 to place it in proper position for being passed across a pick-up head 20. As the tape exits pick-up head 20, it passes between a main capstan 21 and a main capstan pinch roller 22. Main capstan 21 provides speed regulation for the tape. Generally, the tape runs at 240 inches per secnd (6.1 meters per second). The main capstan pinch roller 22 provides necessary tension and pressure on the tape so that no slippage occurs as the tape comes into contact with main capstan 21. From main capstan 21, the tape is conveyed to tape storage bin 23. Tape bin 23 is located in the lower one half of tape transporter 10 and comprises a large enclosure having a transparent cover.

The depth (front-to-back) of tape bin 23 is only slightly greater than the width of the tape. This means that a single width of tape is accumulated in loop form from the bottom of the tape bin 23 upwardly. The tape is transported into tape bin 23 by means of a tape bin motor 24 which rides against a tape bin pinch roller 25. A scraper 26 ensures that the rapidly moving tape does not wind around tape bin motor 24. As the tape is propelled into tape bin 23, it piles into small loops. Depending upon the length of the tape, the loops can extend a substantial distance up the tape bin from the bottom to the top in numerous, relatively tightly packed layers. As is apparent, as the tape is pulled from the tape bin 23, the tape is coming from the bottommost portion of tape bin 23 in first in - first out fashion and is therefore under tape which has entered the tape bin 23 subsequently. To position the tape so that it can be most efficiently extracted from tape bin 23, a series of rollers 27 are positioned in an arcuate row along the bottom of tape bin 23. These rollers freewheel when tape is jerked from the bottom of bin 23 and pulled under a guide plate 28 which assists in funneling the tape upwardly into a restricted sized opening 29 where tape exits tape bin 23. The tape passes around a guide roller 30 and then between a servo motor capstan 31 and a servo pinch roller 32. The tape then passes over a vacuum column inlet guide roller 33 and into a vacuum column 34. The tape forms a loop within vacuum column 34 and exits vacuum column 34 by passing around a vacuum column outlet guide roller 35 and then to guide 18 where it begins another circuit.

Heretofore, the term "loop" has been used in several senses. First, the entire length of tape being duplicated has been referred to as a loop because it is connected together to form an endless length of tape. Also, the term "loop" has been used to refer to the mass of loops which the tape forms as it is transported into tape bin 23. Finally, the term "loop" will now be used to define that length of tape present at any given time within vacuum column 34. Hereafter, when the term "loop" is used, it will be used, unless otherwise specified, in the last described manner to define the length of tape present at any given time within vacuum column 34.

Referring still to FIG. 1, vacuum column 34 is enclosed on the back, front, bottom and sides to form an enclosure having approximately the same depth as the width of the tape. Vacuum column 34 is enclosed on the front by a transparent cover so that the position of the loop within the vacuum column 34 can be visually observed. A vacuum supply 36 is enclosed within the tape transporter cabinet 11 and is shown schematically in FIG. 6. Vacuum pressure to vacuum column 34 is provided through a flexible conduit 38 which communicates through a series of small orifices (not shown) in the bottom of vacuum column 34. An elongate sensing slot 39 is provided in the back wall of vacuum column 34. Sensing slot 39 is operatively connected to a column transducer 40 which converts the sensed vacuum pressure to an electronic output signal which is amplified in a servo amplifier 41 and relayed to the servo motor capstan 31. (See FIG. 6).

Referring again to FIG. 1, note that the loop of tape is in sealing relation to opposite side walls of vacuum column 34. This effectively divides vacuum column 34 into two zones—zone 34A which is in open communication with atmospheric pressure and is defined as being inside the loop of tape, and a zone 34B which is sealed against communication with atmospheric pressure, communicates with the vacuum supply 36 through vacuum conduit 38 and is defined as being outside the loop of tape. Sensing slot 39 interrupts the seal between zones 34A and 34B. The tension on the tape within the vacuum column always remains the same. Movement of the loop of tape within vacuum column 34 is caused by tension variatins of the tape within bin 23 which is transmitted through servo motor capstan 31 as tape speed variation and tension.

Figure 2:
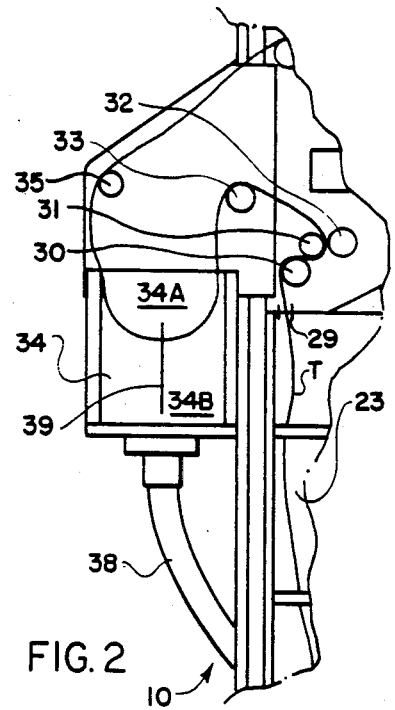
FIG. 2 is a fragmentary view of the vacuum column portion of the transporter shown in FIG. 1, showing the loop of tape within the vacuum column in a particular position relative to the sensing slot.
Figure 6:
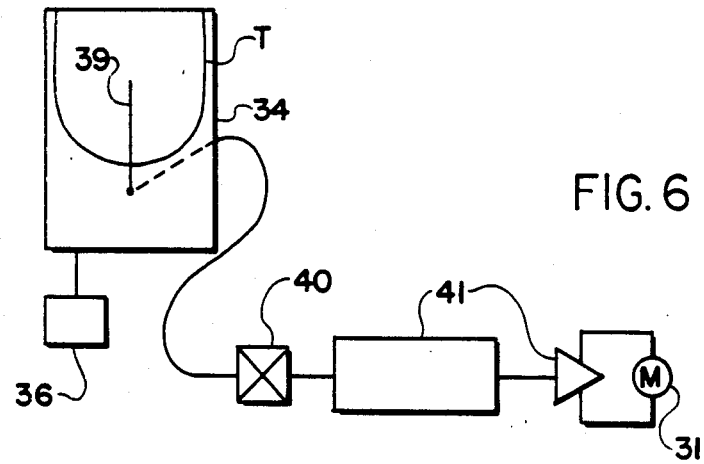
FIG. 6 is a block diagram of the servo-control means by which the speed of the capstan motor is regulated by vacuum pressure variation according to the position of the loop of tape within the vacuum column.

Referring now to FIG. 2, the loop of tape is shown in a relatively high position within vacuum column 34. This loop position occurs when relatively high tension is present on the tape as it is being withdrawn from tape bin 23. The relatively high tension causes slippage and/or slightly reduced motor speed which momentarily delivers less tape to vacuum column 34 than is being withdrawn by the main capstan 21. This, in effect, partially exhausts the supply of tape within vacuum column 34, necessarily meaning that the loop is shorter and zone 34B becomes correspondingly larger. A larger portion of sensing slot 39 is therefore in vacuum communicatin within zone 34B with the vacuum supply 36, causing a change in sensed vacuum pressure proportional to the position of the tape within vacuum column 34. As is shown in FIG. 6, the column transducer 40 generates an output signal to the servo amplifier 41 which in turn causes the servo motor capstan 31 to increase its speed to a sufficient degree to momentarily increase the rate at which it delivers tape to vacuum column 34.

Figure 3:
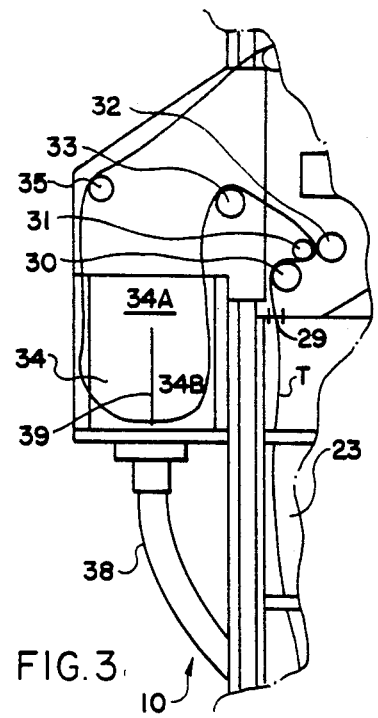
FIG. 3 is another view of the vacuum column shown in FIG. 1 with the loop of tape shown in another position relative to the sensing slot.

Conversely, a momentary decrease in the tension of the tape being pulled from tape bin 23 causes more tape to be delivered to vacuum column 34 than is being withdrawn. This is shown in FIG. 3, where the loop extends lower into vacuum column 34, reducing the size of zone 34B and increasing the size of zone 34A by a corresponding amount. Column transducer 40 senses this change in loop position through sensing slot 39 and sends a signal to servo capstan 31 which reduces its speed so that somewhat less tape is delivered into vacuum column 34A than is being withdrawn. The "servo" aspect of the operation of vacuum column 34 means that the speed of capstan motor 31 is varying constantly as the loop of tape moves upwardly and downwardly within vacuum column 34. Under ideal circumstances, the loop of tape would intersect sensing slot 39 and define a reference position at its approximate midpoint and the capstan 31 would deliver exactly the same length of tape per unit of time to vacuum column 34 as is withdrawn. The extent to which tension variations within tape bin 23 varies from the ideal determines the extent to which the loop within vacuum column 34 changes position and, consequently, the extent to which the speed of capstan motor 31 is varied to always try and put the loop of tape back in the reference position at the proximate midpoint of sensing slot 39.

Figure 4:
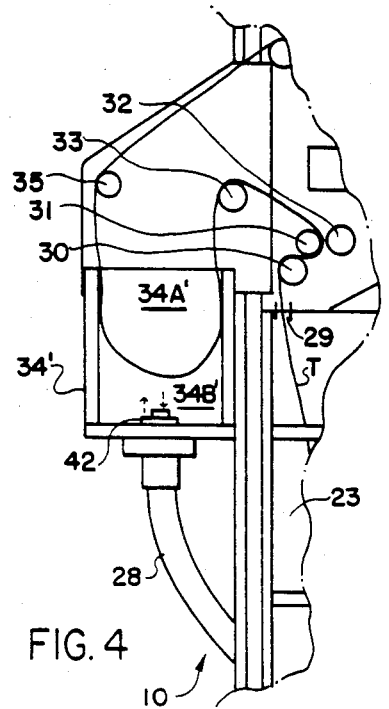
FIG. 4 is a fragmentary view of a vacuum column according to the embodiment of the invention wherein an ultrasonic proximity sensor is used to determine the position of the loop of tape within the vacuum column.
Figure 7:
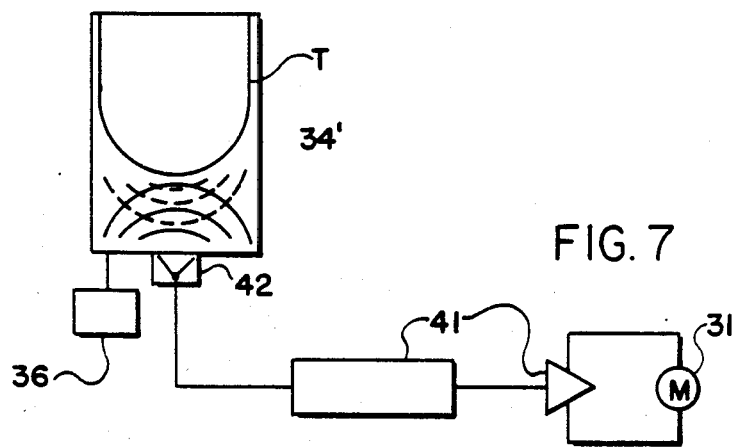
FIG. 7 is a block diagram of the servo-control means which includes the use of an ultrasonic proximity sensor to determine the position of the loop of tape within the vacuum column.

The use of sensing slot 39 in combination with vacuum column 34 is the preferred means of controlling the servo operation of motor capstan 31. However, other means of servo-control may be used. One such means is shown in FIGS. 4 and 7. Referring to FIG. 4, an ultrasonic proximity sensor 42 is positioned in the bottom of a loop bin 34'. An ultrasonic sound wave is projected upwardly into vacuum column 34' and into contact with the bottom of the loop of tape within vacuum column 34'. As is well known, sound at any given atmospheric pressure travels at a constant speed. Accordingly, by projecting a soundwave against an object which reflects the soundwave back to its source, the distance between the sensor and the reflecting object can be calculated. Accordingly, a momentary increase in tension, causing the loop of tape to move upwardly in the vacuum column 34' is detected by ultrasonic proximity indicator 42. The increase in distance between the bottom of the loop of tape and sensor 42 is calculated and converted into an outut signal which increases the speed of capstan motor 31 to a corresponding degree sufficient to supply additional tape to vacuum column 34' so that the loop of tape reassumes its reference midpoint in vacuum column 34'. Likewise, movement of the loop of tape downwardly towards sensor 42 results by the same process in a momentary reduction in speed of capstan motor 31 sufficient to reposition the loop at its reference position. As with the vacuum pressure sensing system illustrated in FIGS. 1, 2 and 3, the ultrasonic proximity sensor offers an essentially infinite number of straight line variations between the maximum and minimum positions of the tape within vacuum column 34A'.

Figure 5:
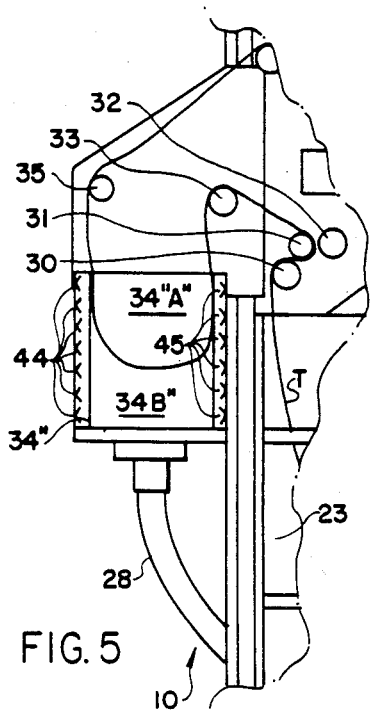
FIG. 5 is a fragmentary view of the vacuum column according to the embodiment of the invention wherein a series of optical sensors is used to determine the position of the loop of tape within the vacuum column.
Figure 8:
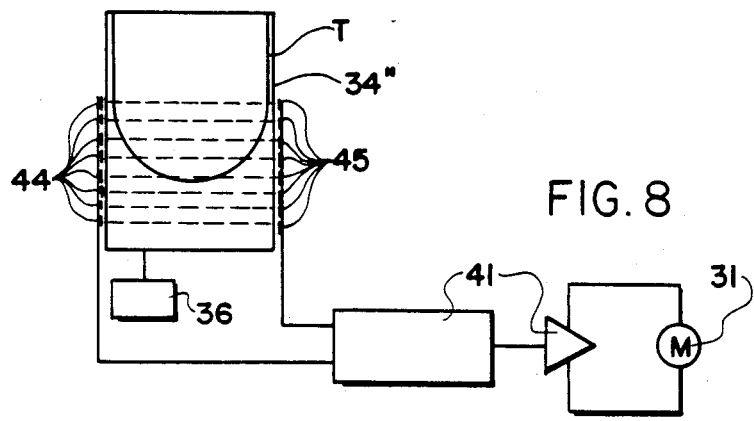
FIG. 8 is a block diagram of the servo-control means which includes the use of a series of optical sensors to determine the position of the loop of tape within the vacuum column.

Another embodiment of the invention is illustrated in FIGS. 5 and 8. In FIG. 5, a vacuum column 34" is shown and is provided with a series of optical sensors. A series of optical beam transmitters 44 are positioned in regularly spaced-apart relation along the length of vacuum column 34" on one side, and a like series of spaced-apart optical receivers 45 are placed in registration with optical transmitters 44 on the opposite side of vacuum column 34". Therefore, the position of the loop of tape within vacuum column 34" can be determined by the number of receivers 45 which are receiving the light beam from the corresponding number of transmitters 44. The loop of tape within vacuum column 34" interrupts the passage of one or more light beams so that by monitoring the number of light beams thus interrupted, the position of the loop of tape can be determined. The degree of accuracy with which the position of the loop of tape is calculated is dependent on the number of transmitters 44 and receivers 45 provided, and their spacing along the side walls of vacuum column 34".

Other types of optical systems can be used as well. For example, optical reflectors (not shown) can be substituted for the optical receivers 45 so that the same tape position sensing information is calculated based upon the interruption of the reflection of one or more light beams from transmitter to the reflector and back.

In addition to greatly enhanced tension control, a number of other advantages have been observed. Because of the gentle handling of the tape which is inherent in the use of vacuum, the master tape has been found to wear at a much slower rate. This permits the master tape to be used for a longer period of time before replacement is necessary. Also, in prior art machines, the tape is usually wiped with a fabric-like substance before each pass of the tape across the pick-up heads. This is to remove lint, dust, loose oxide particles and the like.

It has been observed that the vacuum exerted on the tape as it passes through vacuum column 34 is sufficient to remove dust, lint and loose oxide particles without physically contacting the tape at all.

The vacuum column tension control is described above. Various details of the invention may be changed without departing from its scope. Furthermore, the foregoing description of the preferred embodiment according to the present invention is provided for the purpose of illustration and not for the purpose of limitation—the invention being defined by the claims.

I claim:

1. In a closed loop, high-speed tape transporter of the type wherein a closed loop of recording tape is passed across a pick-up head where a signal on the loop of tape is conveyed downstream to at least one slaved duplicator, and wherein the loop of tape is conveyed from the pick-up head into a bin for accumulation and storage while a trailing length of the loop is passed across the pick-up head, and from the bin back across the pick-up heads repeatedly whereby successive replications of the signal from the loop are conveyed from the pick-up head to the slaved duplicator, the improvement which comprises:

(a) vacuum supply means;

(b) a vacuum column operatively connected to said vacuum supply means and positioned in the plane of tape travel intermediate the exit location of the loop from the bin and the pick-up head for receiving the loop of tape during its travel and exerting a vacuum-induced tension thereon;

(c) a motor-driven capstan positioned in the plane of tape travel intermediate the bin and the vacuum column for pulling the loop of tape from the bin and delivering the tape to the vacuum column; and (d) servo-control means for sensing changes in the position of the tape within the vacuum column caused by tension changes of the tape within the bin and sending a signal responsive to the change of position of the tape in said vacuum column to said capstan motor and varying the capstan speed responsively to the sensed position changes to maintain constant tension on the moving loop as it is delivered to the pick-up head.

2. In a tape transporter according to claim 1, and including a pinch roller positioned for rotating engagement with said capstan.

3. In a tape transporter according to claim 1, wherein said vacuum column comprises an enclosure having a depth approximately that of the tape to provide a seal between that portion of the vacuum column outside the loop of the tape and that portion of the vacuum column inside the loop of tape, and at least one sensing slot positioned in the vacuum column in vacuum communication with said vacuum supply means and interrupting the seal between the outside and inside of the loop of tape within the vacuum column and communicating information corresponding to tape position-related vacuum pressure to said servo-control means for servo-regulating the speed of the capstan motor.

4. In a tape transporter according to claim 1, wherein said vacuum column comprises an enclosure having a depth approximately that of the tape to provide a seal between that portion of the vacuum column outside the loop of the tape and that portion of the vacuum column inside the loop of the tape, and a series of optical sensors positioned in spaced-apart relation along the length of the vacuum column, each optical sensor projecting a beam across said vacuum column to sense the position of the loop of tape within the vacuum column and communicate the position of the loop of tape within the vacuum column to said servo-control means for servo-regulating the speed of the capstan motor.

5. In a tape transporter according to claim 1, wherein said vacuum column comprises an enclosure having a depth approximately that of the the tape to provide a seal between that portion of the vacuum column outside the loop of the tape and that portion of the vacuum column inside the loop, and an ultrasonic proximity sensor positioned in the bottom of the vacuum column in the area outside the loop of the tape to send an ultrasonic signal upwardly in the vacuum column into contact with the moving loop of tape and receive the reflected ultrasonic signal, and including means for calculating the position of the loop of tape in the vacuum column from the time delay between the transmission of the ultrasonic signal and the receipt of the reflected signal and communicating the position of the loop of tape to said servo-control means for servo-regulating the speed of the capstan motor.

6. A vacuum column tension control apparatus for a closed loop high-speed tape transporter of the type wherein a closed loop of recording tape is passed across a pick-up head where a signal on the loop of tape is conveyed downstream to at least one slaved duplicator, and wherein the loop of tape is conveyed from the pick-up head into a bin for accumulation and storage while a trailing length of the loop is passed across the pick-up head, and from the bin back across the pick-up heads repeatedly whereby successive replications of the signal from the loop are conveyed from the pick-up head to the slaved duplicator, said tension control apparatus comprising:
  (a) vacuum supply means;
  (b) a vacuum column operatively connected to said vacuum supply means for being positioned in the plane of tape travel intermediate the exit location of the loop from the bin and the pick-up head for receiving the loop of tape during its travel and exerting a vacuum-induced tension thereon;
  (c) a motor-driven capstan for being positioned in the plane of tape travel intermediate the bin and the vacuum column for pulling the loop of tape from the bin and delivering the tape to the vacuum column; and
  (d) servo-control means for sensing changes in the position of the tape within the vacuum column caused by tension changes of the tape within the bin and sending a signal responsive to the change of position of the tape in said vacuum column to said capstan and varying the capstan speed responsively to the sensed position changes to maintain constant tension on the moving loop as it is delivered to the pick-up head.

7. A vacuum column tension control apparatus according to claim 6, and including a pinch roller positioned for rotating engagement with said capstan.

8. A vacuum column tension control apparatus according to claim 6, wherein said vacuum column comprises an enclosure having a depth approximately that of the tape to provide a seal between that portion of the vacuum column outside the loop of the tape and that portion of the vacuum column inside the loop of tape, and at least one sensing slot positioned in the vacuum column in vacuum communication with said vacuum supply means and interrupting the vacuum seal between the outside and inside of the loop of tape within the vacuum column and communicating information corresponding to tape position-related vacuum pressure to said servo-control means for servo-regulating the speed of the motor and the capstan.

9. A vacuum column tension control apparatus according to claim 6, wherein said vacuum column comprises an enclosure having a depth approximately that of the tape to provide a seal between that portion of the vacuum column outside the loop of the tape and that portion of the vacuum column inside the loop of the tape, and a series of optical sensors positioned in spaced-apart relation along the length of the vacuum column, each optical sensor projecting a beam across said vacuum column to sense the position of the loop of tape within the vacuum column and communicate the tape position-related vacuum pressure to said servo-control means for servo-regulating the speed of the motor and the capstan.

10. A vacuum column tension control apparatus according to claim 6, wherein said vacuum column comprises an enclosure having a depth approximately that of the the tape to provide a seal between that portion of the vacuum column outside the loop of the tape and that portion of the vacuum column inside the loop, and an ultrasonic proximity sensor positioned in the bottom of the vacuum column in the area outside the loop of the tape to send an ultrasonic signal upwardly in the vacuum column into contact with the moving loop of tape and receive a reflected ultrasonic wave, and including means for calculating the position of the loop of tape in the vacuum column from the time delay between the transmission of the ultrasonic signal and the receipt of the reflected signal and communicating the position of the loop of tape to said servo-control means for servo-regulating the speed of the motor and the capstan.

11. A method of controlling tension in a closed loop high-speed tape transporter of the type wherein a closed loop of recording tape is passed across a pick-up head where a signal on the loop of tape is conveyed downstream to at least one slaved duplicator, and wherein the loop of tape is conveyed from the pick-up head into a bin for accumulation and storage while a trailing length of the loop is passed across the pick-up head, and from the bin back across the pick-up heads repeatedly whereby successive replications of the signal from the loop are conveyed from the pick-up head to the slaved duplicator, said tension control method comprising:
  (a) pulling the tape under positive feed from the bin;
  (b) delivering the tape to a vacuum column;
  (c) applying a vacuum-induced tension to the moving loop of tape and causing the tape to form a loop in the vacuum column;
  (d) sensing the position of the tape in the vacuum column responsive to tension changes in the tape as it is pulled from the bin; and
  (e) varying the speed of delivery of the tape from the bin to the vacuum column responsive to the change in position of the tape within the vacuum column to maintain constant tension on the moving loop of tape as it is delivered to the pick-up head of the tape transport.

12. The method according to claim 11, wherein the step of sensing the position of the loop of tape within the vacuum column comprises:
    (a) providing a vacuum seal between that portion of the vacuum column outside the loop of the tape and that portion of the vacuum column inside the loop of the tape;
    (b) providing one sensing slot in the vacuum column in vacuum seal interrupting position between the outside and inside of the loop of tape within the vacuum column;
    (c) sensing the change in vacuum pressure caused by change of position of the loop within the vacuum column; and
    (d) varying the speed at which the tape is pulled from the bin in relation to the position-related vacuum pressure.

13. The method according to claim 11, wherein the step of sensing the position of the loop of tape within the vacuum column comprises:
    (a) providing a series of optical sensors positioned in spaced-apart relation along the length of the vacuum column;
    (b) utilizing the optical sensors to sense the position of the loop of tape within the vacuum column; and
    (c) varying the speed at which the tape is pulled from the bin in response to the position of the loop of tape within the vacuum column.

14. A method according to claim 11, wherein the step of sensing the position of the loop of tape within the vacuum column comprises:
    (a) providing an ultrasonic proximity sensor in the bottom of the vacuum column in the area outside the loop of tape to send an ultrasonic signal upwardly in the vacuum column in contact with the moving loop of tape;
    (b) reflecting an ultrasonic signal off the loop of tape;
    (c) calculating the position of the loop of tape in the vacuum column from the time delay between the transmission of the ultrasonic signal and the receipt of the reflected signal; and
    (d) varying the speed at which the tape is pulled from the bin to maintain constant tension on the moving loop as it is delivered to the pick-up head.

* * * * *